United States Patent
Gnanamoorthy (10) Patent No.: US 9,639,315 B2
(45) Date of Patent: May 2, 2017

(54) CONTENT PRODUCTION

(75) Inventor: Venu Prasad Gnanamoorthy, Pondicherry (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1185 days.

(21) Appl. No.: 12/912,432

(22) Filed: Oct. 26, 2010

(65) Prior Publication Data

US 2012/0102413 A1  Apr. 26, 2012

(51) Int. Cl.
  *G06F 3/00* (2006.01)
  *G06F 3/12* (2006.01)
  *H04L 29/08* (2006.01)

(52) U.S. Cl.
  CPC ............ *G06F 3/1285* (2013.01); *G06F 3/122* (2013.01); *G06F 3/1265* (2013.01); *G06F 3/1271* (2013.01); *H04L 67/02* (2013.01); *H04L 67/04* (2013.01); *G06F 3/129* (2013.01); *G06F 3/1256* (2013.01); *G06F 2206/1512* (2013.01)

(58) Field of Classification Search
  CPC ...................................................... G06F 3/122
  USPC ......................................................... 715/748
  See application file for complete search history.

(56) References Cited

U.S. PATENT DOCUMENTS

| | | | |
|---|---|---|---|
| 7,321,437 B2 | 1/2008 | Parry | |
| 7,680,865 B2* | 3/2010 | Tashiro et al. | 707/784 |
| 8,181,117 B2* | 5/2012 | Bruce | G06F 17/30147 715/748 |
| 2001/0028363 A1* | 10/2001 | Nomoto et al. | 345/748 |
| 2003/0123079 A1* | 7/2003 | Yamaguchi | G06F 3/1204 358/1.15 |
| 2004/0046788 A1* | 3/2004 | Keane et al. | 345/748 |
| 2005/0097438 A1* | 5/2005 | Jacobson | 715/500.1 |
| 2008/0091763 A1* | 4/2008 | Devonshire et al. | 709/201 |
| 2008/0134316 A1* | 6/2008 | Devonshire et al. | 726/15 |
| 2008/0307318 A1* | 12/2008 | Sullivan | 715/748 |
| 2008/0307319 A1* | 12/2008 | Iwata et al. | 715/748 |
| 2009/0044130 A1* | 2/2009 | Saluja | 715/750 |
| 2009/0106666 A1* | 4/2009 | Nomura | 715/748 |
| 2009/0144629 A1* | 6/2009 | Ferlitsch et al. | 715/736 |
| 2009/0164601 A1* | 6/2009 | Swartz | G06Q 30/02 709/217 |
| 2009/0310152 A1* | 12/2009 | Roulland et al. | 358/1.9 |
| 2010/0064231 A1* | 3/2010 | Gupta | 715/748 |
| 2010/0070876 A1* | 3/2010 | Jain et al. | 715/748 |
| 2010/0073707 A1 | 3/2010 | Ferlitsch | |

(Continued)

OTHER PUBLICATIONS

Chris Davies, HP ePrint Web-Connected Printer Service Debuts, Web Page, Jun. 7, 2010.

(Continued)

*Primary Examiner* — William Titcomb
(74) *Attorney, Agent, or Firm* — HP Inc. Patent Department (57) ABSTRACT

A method includes causing a display by a first device of a user interface containing a visual representation of content accessed from a source remote from the first device. Responsive to a user's selection of a first control associated with the user interface, a hard copy representation of the content is caused to be generated. Responsive to a user's selection of a second control associated with the user interface, an electronic file representation of the content is caused to be communicated to a second device remote from the first device.

20 Claims, 5 Drawing Sheets

(56) References Cited

U.S. PATENT DOCUMENTS

| | | | |
|---|---|---|---|
| 2010/0171973 A1* | 7/2010 | Kimura | 358/1.14 |
| 2010/0180209 A1* | 7/2010 | Yang et al. | 715/748 |
| 2011/0035682 A1* | 2/2011 | Chang et al. | 715/752 |
| 2011/0055714 A1* | 3/2011 | Vemulapalli et al. | 715/739 |
| 2011/0072356 A1* | 3/2011 | Suwabe | 715/738 |
| 2011/0093366 A1* | 4/2011 | Nuggehalli et al. | 705/30 |
| 2011/0276986 A1* | 11/2011 | Kamath et al. | 719/328 |
| 2011/0289440 A1* | 11/2011 | Carter et al. | 715/771 |
| 2011/0314042 A1* | 12/2011 | Nuggehalli et al. | 707/769 |
| 2012/0047443 A1* | 2/2012 | Tarkoma | 715/744 |
| 2012/0089664 A1* | 4/2012 | Igelka | 709/203 |

OTHER PUBLICATIONS

Wayne Grayson, Google Announces Web App for Printing From Mobile Device, Web Page, Apr. 16, 2010, Tuscaloosa News, http://grayson.blogs.tuscaloosanews.com/11308.

* cited by examiner

FIG. 7

CONTENT PRODUCTION

BACKGROUND

From a user interface displayed by a printer, a user can select content to be printed. For example, the user interface may present a visual representation of that content and a control that, when selected, causes a device ready representation of the content being delivered to the printer. The printer then processes the device ready representation to produce a hard copy representation of the content.

DETAILED DESCRIPTION

Introduction

Various embodiments described below were developed in an effort to allow a user, from a user interface displayed by a printer, to selectively cause the printer to produce a hard copy representation of content or to cause an electronic file representation of that content to be communicated to another device for later use. For example, it may be the case that the printer is unable to print at the time due to a malfunction or a lack of supplies such as paper or imaging material. It may also be the case that the user is simply not ready to print but desires not to lose track of the content. The term content, as used herein, refers to electronic data representing text, images, or a combination thereof. When processed, representations of the content can be caused to be printed, displayed as part of a user interface, and archived and communicated as an electronic file. In a particular example, content may be web content originating from a web server.

According to an embodiment, the printer is caused to display a visual representation of content accessible from a source remote from the printer. Such content, for example may be a map, a puzzle, an image, or a news article. The user interface is associated with at least two user accessible controls. In the event the printer includes a touch screen display, the controls may be controls displayed on that interface. Instead, the controls may be physical/tactile buttons separate from display. Responsive to a user's selection of a first of the controls, the printer is caused to produce a hard-copy representation of the content. A hard copy representation of the content is a representation that can be held by a user apart from a printer or other device. An example includes a sheet of media such as paper on which a representation of the content is printed.

Responsive to a user's selection of a second control, an electronic file representation of the content is caused to be communicated to a second device different than the first device. Such may involve generating an electronic file from the content and communicating that file to a network address associated with the second device. That address may be an e-mail address associated with a device configured to receive e-mails for a user. Instead of sending the electronic file as an attachment to an e-mail, the electronic file may be archived, and a network reference for accessing the electronic file may be communicated in the e-mail.

Figure 1:
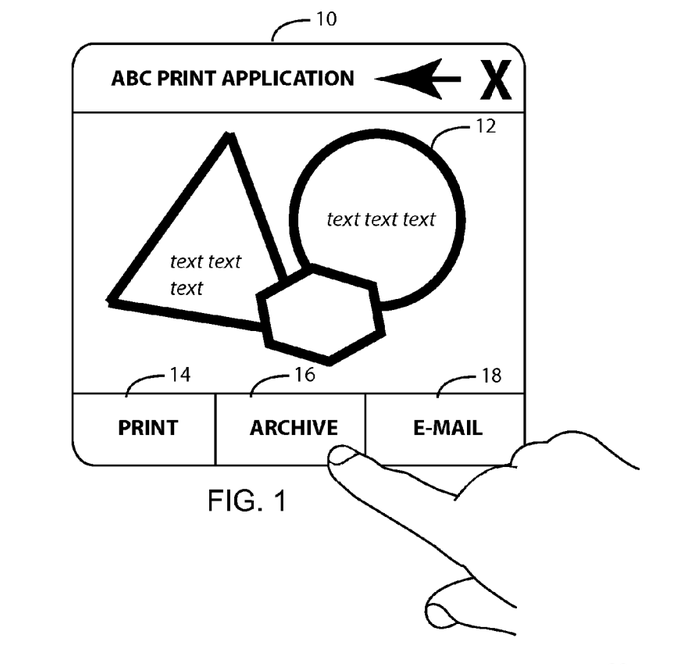
FIGS. 1 and 2 depict examples of user interface displays according to embodiments.

FIGS. 1 and 2 depict examples of screen views of user interfaces. User interface 10 in FIG. 1 includes visual representation 12 of content along with controls 14, 16, and 18. Responsive to a user's selection of control 14, a hard-copy representation of the content is printed. Responsive to selection of control 16, an electronic file representation of the content is archived. Responsive to selection of control 18, an electronic file representation of the content is communicated. Such communication may include the electronic file or a network reference for retrieving the electronic file.

Figure 2:
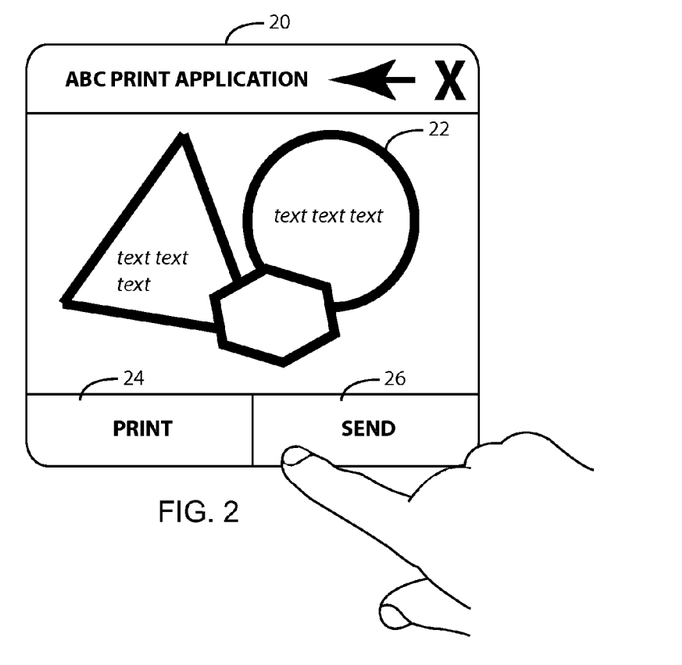

User interface 20 in FIG. 2 includes a visual representation 22 of the content. In this example, user interface 20 includes controls 24 and 26. Responsive to a user's selection of control 24, hardcopy representation of the content is printed. Responsive to selection of control 26, an electronic file representation of the content is caused to be communicated. The electronic file itself may be communicated or a network reference such as an URL (Uniform Resource Locator) for accessing the file may be communicated. A determination as to whether the file or the network reference is communication may be made automatically based on one or more factors. Factors can include the size of the electronic file. For example, when the size of the file exceeds a threshold, a network reference is communicated, and otherwise the file is communicated. Other factors can include default or user specified preferences.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Environment

Figure 3:
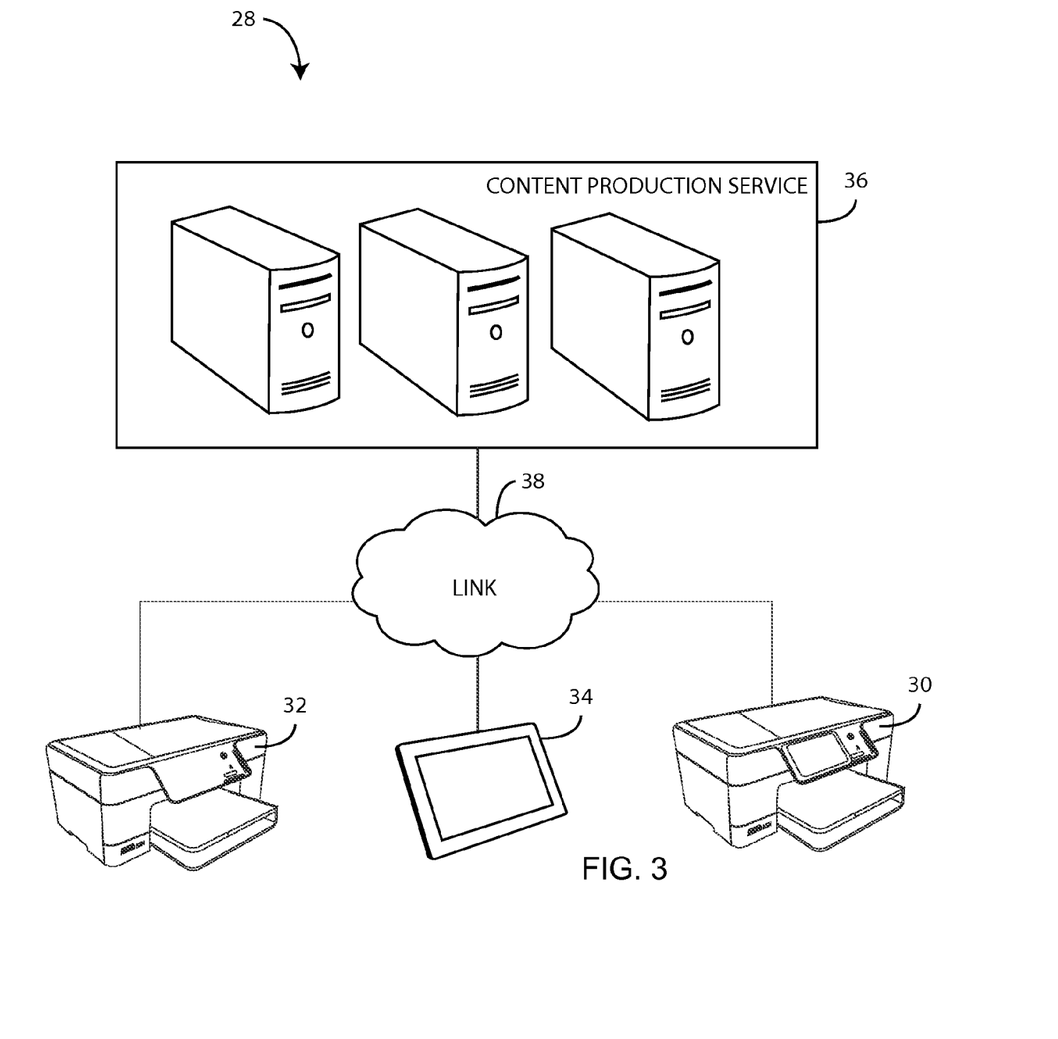
FIG. 3 depicts an exemplary environment in which various embodiments may be implemented.

FIG. 3 depicts an exemplary network 28 in which various embodiments may be implemented. Network 28 is shown to include devices 30, 32, and 34 and content production service 36. Devices 30, 32, and 34 represent generally any electronic devices capable of communicating with content production service 36 to request the performance of specified functions. Such functions can include the generation and delivery of jobs. In the example of FIG. 3, devices 30 and 32 are printers capable of processing print jobs received from content production service 36. Here the print jobs include device ready representation of content that is to be printed. Device 30 includes an integrated display, while device 32 does not. Device 34 is a display device that can serve as a display for device 32.

Content production service 36 represents a network service configured to interact with devices 30-34. Such interactions include causing devices 30 and 34 to display visual representations of content. Other interactions cause devices 30 and 32 to produce hard-copy representations of that content. Content production service 36 may also be responsible for generating electronic file representations of the content and communicating the electronic files or network references for obtaining those electronic files to destinations other than devices 30, 32, or 34.

In performing its functions, content production service 36 may project interfaces to be displayed by devices 30 and 34. Projecting an interface involves communicating to device 30 or 34 a description of a user interface that contains a visual representation of content. Such may include communicating the content itself or processing the content into another format compatible for display by device 30 or 34. Responsive to a user's interaction with the user interface, content production service 36 then causes device 30 or 32 to produce a hard copy representation of the content or causes an electronic file representation of the content to be communicated to a device other than devices 30-34. When causing the device to produce a hard-copy representation, service 36 may stream a device ready representation of the content to device 30 or 32 with at least implicit instructions to process the stream and produce printed output. When causing an electronic file representation to be communicated, service 36 may process the content to generate the electronic file such as a PDF (Portable Document Format) file. Alternatively, device 30, 32, or 34 may be responsible for processing the content to generate the electronic file. That electronic file or a network reference for accessing the electronic file is then communicated.

Components 30-36 are interconnected via link 38. Link 38 represents generally one or more of a cable, wireless, fiber optic, or remote connections via a telecommunication link, an infrared link, a radio frequency link, or any other connectors or systems that provide electronic communication. Link 38 may include, at least in part, an intranet, the Internet, or a combination of both. Link 38 may also include intermediate proxies, routers, switches, load balancers, and the like. The paths followed by link 38 between components 30-36 as depicted in FIG. 3 represent the logical communication paths between these devices, not necessarily the physical paths between the devices.

Components

Figures 4, 5:
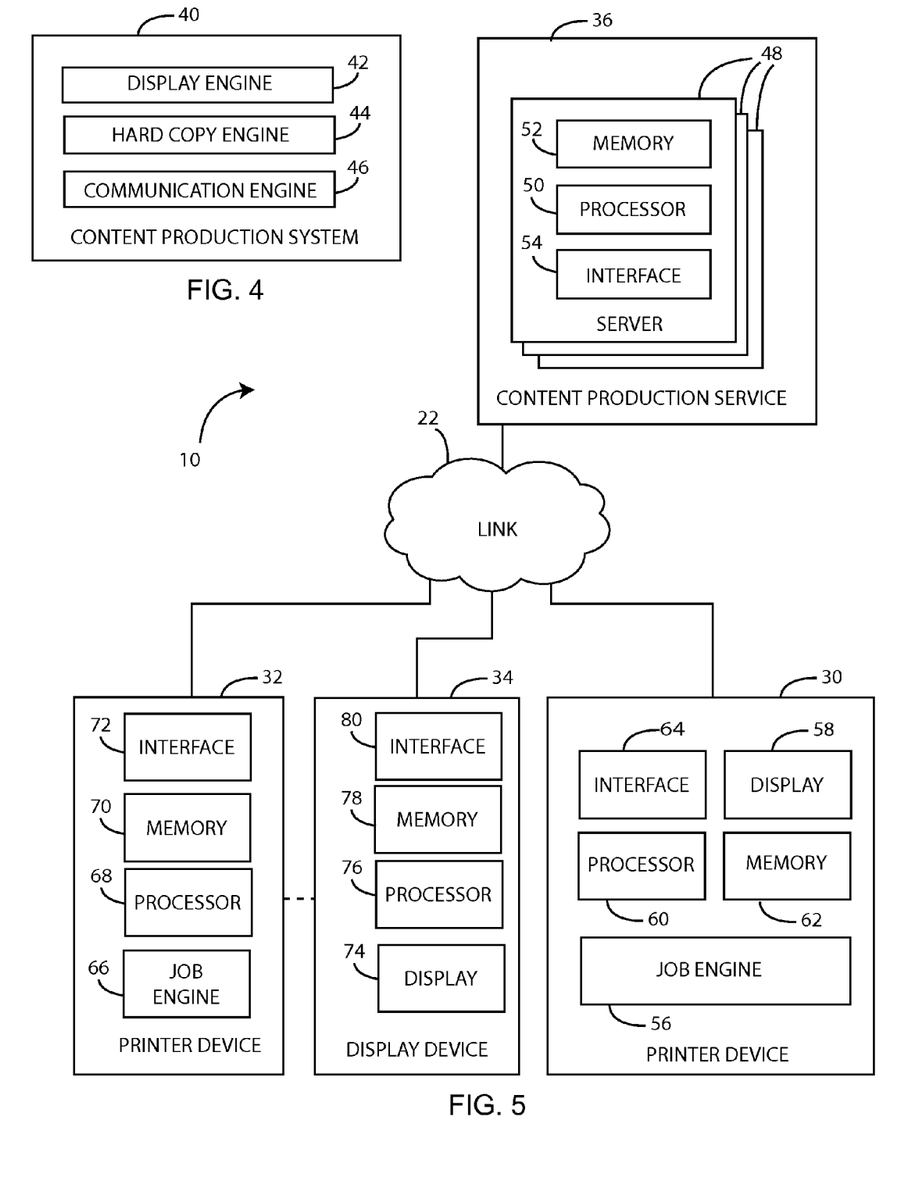
FIGS. 4 and 5 depict examples of various physical and logical components for implementing various embodiments.

FIG. 4 depicts various physical and logical components for implementing various embodiments. In particular, FIG. 4 depicts a content production system 40. In the example of FIG. 4, system 40 includes display engine 42, hard copy engine 44, and communication engine 46. Referring back to FIG. 3, components 42-46 may be implemented by devices 30-34, content production service 36, or distributed between devices 30-34 and service 36.

Display engine 42 represents generally any combination of hardware and programming configured to cause a display by a first device of a user interface containing a visual representation of content accessed from a source remote from the first device. Referring to FIG. 3, when implemented by content production service 36, display engine 42 may communicate data to device 30 or 34 with at least implicit instructions that the given device 30 or 34 process the data to cause the display of a user interface containing the visual representation of the content. Such data may, for example, be in the format of a mark-up language such as XML (extensible mark-up language) or HTML (hypertext mark-up language). When implemented by device 30 or 34, display engine may operate by receiving and processing such data to cause the display of the user interface.

Hard copy engine 44 represents generally any combination of hardware and programming configured to cause, in response to a user's selection of a first control associated with the user interface, the generation of a hard copy representation of the content. Where, for example, hard copy engine 44 is implemented in device 30, 32, or 34 of FIG. 3, engine 44 may perform its function by requesting a device ready representation of the content from content production service 36 and causing device 30 or 32 to generate the hard copy representation from the device ready representation streamed in response to the request. When implemented in content production service 36, hard copy engine 44 may perform its function by rendering the content into a device ready representation and streaming the device ready representation of the content to device 30 or 32 with at least implicit instructions that device 30 or 32 generate the hard copy representation from the device ready representation.

Communication engine 46 represents generally any combination of hardware and programming configured to, in response to a user's selection of a second control associated with the user interface, cause a communication of an electronic file representation of the content to a second device remote from the first device. An electronic file representation may, for example, be network reference for obtaining an archived electronic file generated from the content. An electronic file representation may instead be the electronic file itself. Where the content is web content such as HTML and JAVA. Communication engine 46 may generate the electronic file by converting the web content to a file format such as PDF and then selectively communicate a reference to the PDF file or the PDF file itself. The determination as to which is sent may be made based upon a size of the PDF file. If the size exceeds a threshold, the reference is communicated. Otherwise the PDF file is sent.

In foregoing discussion, various components were described as combinations of hardware and programming. Such components may be implemented in a number of fashions. In one example, the programming may be processor executable instructions stored on tangible memory and the hardware may include a processor for executing those instructions. The hardware may also or instead include the memory storing the programming in the form of an installation file or files. Thus, certain elements operating on the same device may share a common processor and common memory. Components operating on different devices, then, may utilize different processors and memory. In yet other embodiments the elements may be embodied in a program or programs stored in a tangible memory. FIG. 4 helps illustrate. FIG. 4 is a block diagram illustrating various elements of devices 30, 32, and 34, as well as content production service 36. As noted, content production system 40 of FIG. 4 may be implemented by one or more of device 30, device 32, device 34, and content production service 36.

In FIG. 4, content production service 36 is shown to include a collection of servers 48. Each server includes processor 50, memory 52, and interface 54. Processor 50 represents generally any processor configured to execute program instructions stored in memory 52 to perform various specified functions. Interface 54 represents generally any network interface enabling server 48 to communicate with devices 30, 32, and 34 via link 22. In an implementation, memory 52 represents generally any tangible memory capable of storing a program or programs that when executed cause a given server 48 to provide some or all of the functions of content production system 40 of FIG. 4. In other words, each server 48 may function as an independent implementation of content production system 40, or servers 48 may operated together as a single implementation of system 40.

Device 30 is a printer shown to include job engine 56, display 58, processor 60, memory 62, and interface 64. Job engine 56 represents the hardware for producing a hard copy output—that is—a printed image. For example, job engine 56 may include components configured to deposit imaging material such as ink or toner on a medium such as paper to generate a hard copy representation of an electronic image. Display 58 represents generally a screen that can be caused to display a user interface. Display 58, for example, may me a touch screen and thus also functions as an input device through which a user can control device 30.

Processor 60 represents generally any processor or combination of processors configured to execute program instructions stored in memory 62 to perform various specified functions. Those functions can include causing display 58 to display a user interface that includes a visual representation of content. The functions can include causing job engine 56 to produce a hard copy representation of the content. The functions can also include causing a communication of an electronic file representation of the content to another device. In an implementation, memory 62 represents generally any tangible memory capable of storing a program or programs that when executed cause device 56 to function as content production system 40 of FIG. 4. Execution may cause processor 60 to receive and process data from content production service 36. For example, processor 60 may receive and process data to cause display 58 to present a user interface including the visual representation of content. Processor 60 may receive and process data to cause job engine 56 to produce the hardcopy representation of the content Processor 60 may also receive and process data to cause interface 64 to communicate the electronic file representation of the content.

Working together devices 32 and 34 function similar to device 30. Device 32 performs the printing functions while device 34 presents the user interface though which a user can control the operation of device 32. In doing so, devices 32 and 34 may communicate via link 22 or directly with one another via a wired or wireless interface. Device 32 is shown to include job engine 66, processor 68, memory 70, and interface 72. Job engine 66 (like job engine 56) represents the hardware for producing a hard copy output. Processor 68 represents generally any processor or combination of processors configured to execute program instructions stored in memory 70 to perform various specified functions. Those functions can include causing job engine 66 to produce a hard copy representation of the content.

Device 34 is shown to include display 74, processor 76, memory 78, and interface 80. Display 74 represents generally a screen that can be caused to display a user interface. Display 74, for example, may me a touch screen and thus also functions as an input device through which a user can control devices 34 and 32. Processor 76 represents generally any processor or combination of processors configured to execute program instructions stored in memory 78 to perform various specified functions. Those functions can include causing display 74 to display a user interface that includes a visual representation of content. The functions can include causing device 32 to produce a hard copy representation of the content. The functions can also include causing a communication of an electronic file representation of the content to another device.

In an implementation, memory 70 and memory 78 each represent generally any tangible memory capable of storing a program or programs that when executed cause devices 32 and 34 to function as content production system 40 of FIG. 4. Execution of programs in memory 78 may cause processor 76 to receive and process data from content production service 36. For example, processor 76 may receive and process data to cause display 74 to present a user interface including the visual representation of content. At the direction of device 34, processor 68 may receive and process data to cause job engine 66 to produce the hardcopy representation of the content Processor 76 or 68 may also receive and process data to cause interface 80 or 72 to communicate the electronic file representation of the content to another device.

Looking at FIGS. 4 and 5, components 42-46 are described a combinations of hardware and programming. The hardware portions may, depending on the embodiment, be implemented by processor 50, processor 60, processor 68, processor 76, or a combination thereof. The programming portions, depending on the embodiment can be implemented by programs stored in one or more of memory 52, memory 62, memory 70, and memory 78.

Operation

Figure 6:
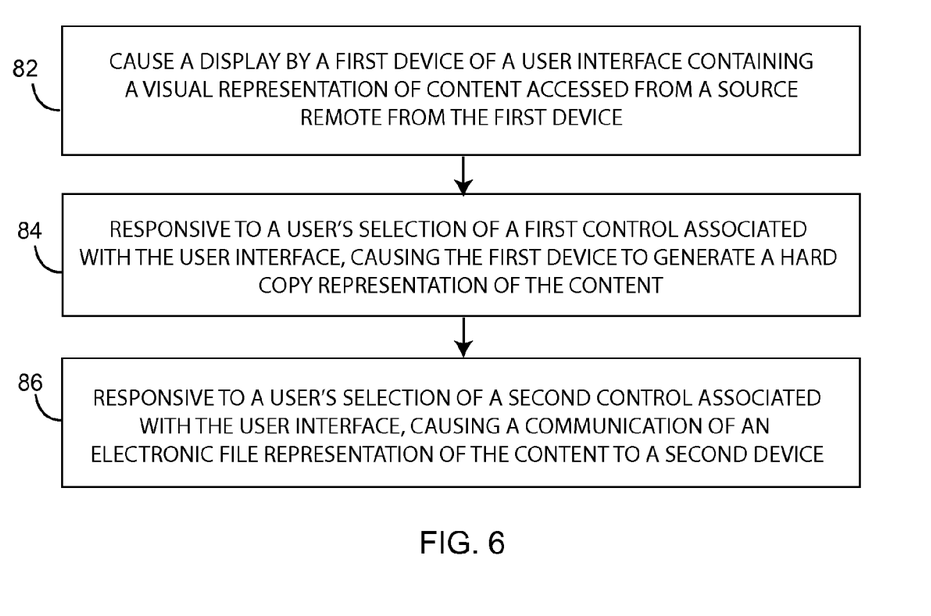
FIGS. 6 and 7 are exemplary flow diagrams depicting steps taken to implement various embodiments.
Figure 7:
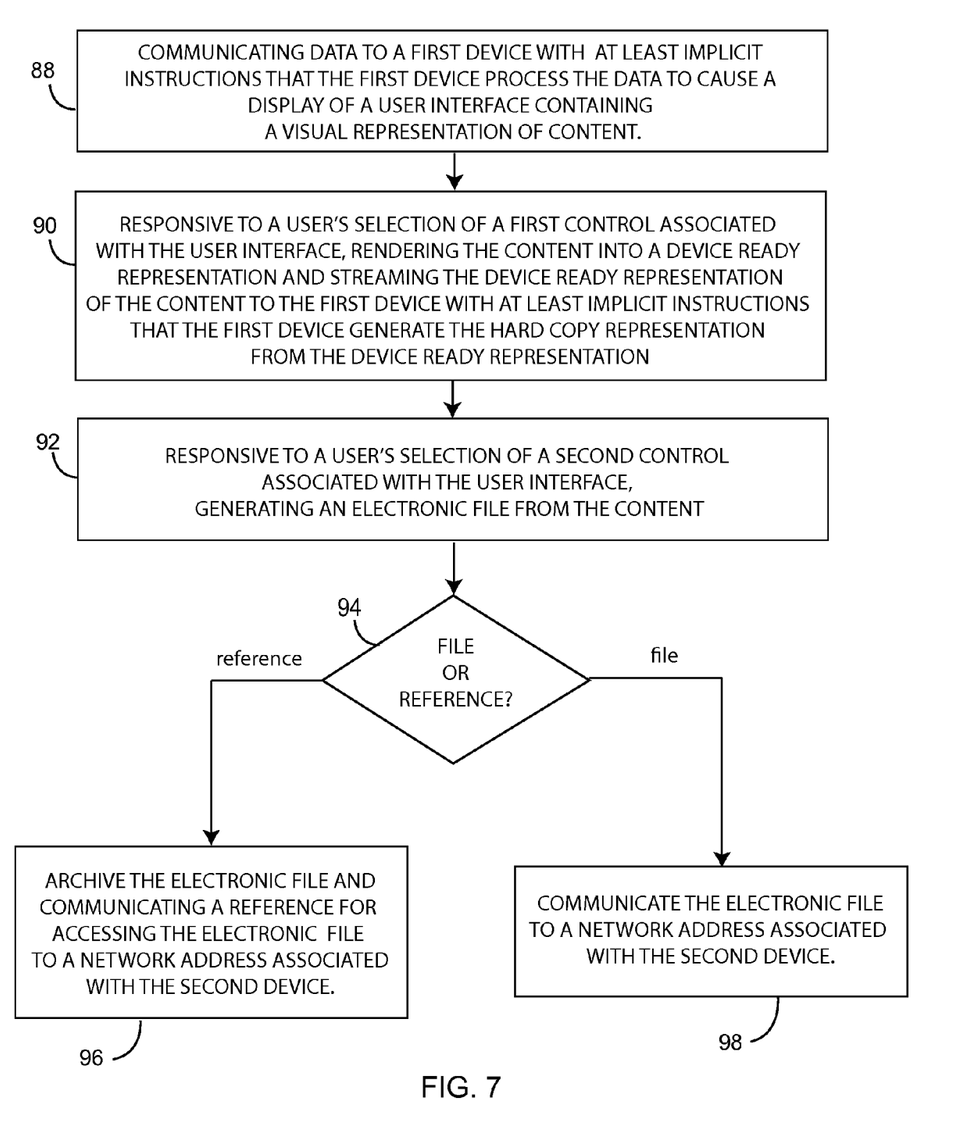

FIGS. 6-7 are exemplary flow diagrams of steps taken to implement various embodiments. In discussing FIGS. 5-6, reference may be made to components of FIGS. 1-5 to provide contextual examples. Implementation, however, is not limited to those examples. Starting with FIG. 6, a first device is caused to display a user interface containing a visual representation of content accessed from a source remote from the first device (step 82). The visual representation may, for example, be a depiction of the content or portion thereof or an iconic representation of the content. Looking at FIG. 4, display engine 42 may be responsible for step 82. When implemented by content production service 36 of FIG. 5, display engine 42 may perform step 82 by communicating data to the first device with at least implicit instructions that the first device process the data to cause the display of a user interface containing a visual representation of the content. Looking at FIG. 5, the first device may be device 30 or device 34. Display engine 42, when implemented by device 30 or 34, may perform step 82 by receiving and processing the data to cause a display of that user interface.

Continuing with FIG. 6, responsive to a user's selection of a first control associated with the user interface, the first device is caused to produce a hard copy representation of the content (Step 84). Responsive to a user's selection of a second control associated with the user interface, a communication of an electronic file representation of the content is caused to be delivered to a second device (Step 86). The first and second controls, as noted above, may be controls presented on a touch screen display. The first and second controls may instead be physical controls.

Referring to FIG. 4, hard copy engine 44 may be responsible for implementing step 84 while communication engine 46 may be responsible for implementing step 86. When implemented by content production service 36 of FIG. 5, hard copy engine 44 perform step 84 by rendering the content into a device ready representation and streaming the device ready representation of the content to the first device with at least implicit instructions that the first device generate the hard copy representation from the device ready representation. The first device in this case may be device 30 or device 32. When implemented by device 30 or 32, hard copy engine 44 may perform step 84 by receiving and processing the device ready representation to generate the hard copy representation.

Communication engine 46, when implemented by content production service 36, device 30, device 32, or device 34, may perform step 86 by generating an electronic file from the content and communicating an electronic file representation to a network address associated with the second device. The electronic file representation may be the electronic file itself or a reference for obtaining the electronic file. When communicating the reference, step 86 can include archiving the electronic file such that it can be retrieved using the reference. A determination as whether to send the electronic file or archive the electronic file and send the reference may be made dynamically based on a number of factors such as file size and user preference. For example, where the size exceeds a threshold, the electronic file may be archived and the reference sent.

Moving to FIG. 7, data is communicated to a first device with at least implicit instructions that the first device process the data to cause a display of a user interface containing a visual representation of content (step 88). The visual representation may, for example, be a depiction of the content or portion thereof or an iconic representation of the content. Looking at FIG. 4, display engine 42 may be responsible for step 88 as implemented by content production service 36 of FIG. 5. Looking At FIG. 5, the first device may be device 30 or device 34.

Responsive to a user's selection of a first control associated with the user interface, the content is rendered into a device ready representation (step 90). The device representation of the content is streamed to a first device with at least implicit instructions that the first device generate a hard copy representation of the content from the device ready representation. Referring to FIG. 4, hard copy engine 44 may be responsible for implementing step 90 as implemented by content production service 36 of FIG. 5.

Responsive to a user's selection of a second control associated with the user interface, an electronic file is generated from the content (step 92). A determination as whether to send the electronic file or to archive the electronic file and send a reference for obtaining the electronic file is made (step 94). The determination in step 94 may be made dynamically based on a number of factors such as file size and user preference. For example, where the size exceeds a threshold, the electronic file may be archived and the reference sent. Upon a determination that a reference be sent, the electronic file is archived and a reference for accessing the archived electronic file is communicated to a network address associated with a second device (step 96). Upon a determination that a file is to be sent, the electronic file is communicated to the network address associated with the second device (step 98). Referring to FIG. 4, communication engine 46, as implemented by content production service 36, may be responsible for steps 92-98.

CONCLUSION

The diagrams of FIGS. 1-5 show the architecture, functionality, and operation of various embodiments. Various components illustrated in FIGS. 1-4 are defined at least in part as programs or programming. Each such component, portion thereof, or various combinations thereof may represent in whole or in part a module, segment, or portion of code that comprises one or more executable instructions to implement any specified logical function(s). These executable instructions, for example, may be embodied in an installation file or files—or—in a file or files already installed. Also, each component or various combinations thereof may represent a circuit or a number of interconnected circuits to implement the specified logical function(s).

Also, an embodiment can be implemented in a computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, hard drives, flash drives, portable discs, random access memory (RAM), read-only memory (ROM), and erasable programmable read-only memory. A given computer readable medium need not be integrated with an instruction execution system. In other words, the medium need not be included in a device with a processor that executes the instructions stored on the medium. For example, a medium such as a hard drive or solid state memory provided by a server may store one or more installation files that can be downloaded or otherwise transferred to the instruction execution system.

Although the flow diagrams of FIG. 6-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method, comprising:
   displaying a visual representation of content on a user interface from a source remote from a first device;
   generating a hard copy representation of the content responsive to a user's selection of a first control associated with the user interface; and
   communicating an electronic file representation of the content to a second device remote from the first device when a determined size of the electronic file exceeds a threshold.

2. The method of claim 1, wherein displaying a visual representation of content is performed by a network service remote from the first device.

3. The method of claim 2, wherein generating the hard copy comprises rendering the content into a device ready representation and streaming the device ready representation of the content to the first device with instructions that the first device generate the hard copy representation from the device ready representation.

4. The method of claim 2, wherein communicating the electronic file comprises generating an electronic file from the content and communicating an electronic file representation by communicating the file to a network address associated with the second device.

5. The method of claim 2, wherein communicating the electronic file comprises generating an electronic file from the content, archiving the electronic file and communicating an electronic file representation by communicating a reference for accessing the archived file to a network address associated with the second device.

6. The method of claim 2, wherein displaying a visual representation of content comprises communicating data to the first device with at least implicit instructions that the first device process the data to cause the display of a user interface containing a visual representation of the content.

7. The method of claim 1, wherein communicating the electronic file comprises selectively communicating one of: an electronic file generated from the content; and a reference for accessing the electronic file to a network address associated with the second device.

8. The method of claim 7, wherein selectively communicating comprises communicating the reference upon a determination that the electronic file has a size that exceeds a threshold.

9. A non-transitory computer readable medium having instructions that when executed cause the implementation of a method, the method comprising:
  displaying a visual representation of content on a user interface from a source remote from a first device;
  generating a hard copy representation of the content responsive to a user's selection of a first control associated with the user interface; and
  communicating an electronic file representation of the content to a second device remote from the first device when a determined size of the electronic file exceeds a threshold.

10. The medium of claim 9, wherein generating the hard copy comprises requesting a device ready representation of the content from a network service remote from the first device and causing the first device to generate the hard copy representation from the device ready representation requested from the network service.

11. The medium of claim 9, wherein communicating the electronic file comprises generating an electronic file from the content and communicating an electronic file representation by communicating the file to a network address associated with the second device.

12. The medium of claim 9, wherein communicating the electronic file comprises causing an electronic file to be generated from the content, causing the electronic file to be archived and causing a communication of the electronic file representation by causing a reference for accessing the archived file to be communicated to a network address associated with the second device.

13. The medium of claim 9, wherein communicating the electronic file comprises selectively causing a communication of one of: an electronic file generated from the content; and a reference for accessing the electronic file generated from the content to a network address associated with the second device.

14. The medium of claim 13, wherein selectively causing comprises causing a communication of the reference upon a determination that the electronic file has a size that exceeds a threshold.

15. A system comprising a display engine, a production engine, and a communication engine, wherein:
  the display engine is configured to display a visual representation of content on a user interface from a source remote from a first device;
  the hard copy engine is configured to generate a hard copy representation of the content responsive to a user's selection of a first control associated with the user interface; and
  the communication engine is configure to communicate an electronic file representation of the content to a second device remote from the first device when a determined size of the electronic file exceeds a threshold.

16. The system of claim 15, wherein the production engine is configured to cause the first device to generate by rendering the content into a device ready representation and streaming the device ready representation of the content to the first device with instructions that the first device generate the hard copy representation from the device ready representation.

17. The system of claim 15, wherein the communication engine is configured to generate an electronic file from the content and communicate an electronic file representation by communicating the file to a network address associated with the second device.

18. The system of claim 15, wherein the communication engine is configured to generate an electronic file from the content, archive the electronic file and communicate an electronic file representation by communicating a reference for accessing the archived file to a network address associated with the second device.

19. The system of claim 15, wherein the communication engine is configured to communicating the electronic file by selectively communicating one of: the an electronic file generated from the content; and a reference for accessing the electronic file generated from the content to a network address associated with the second device.

20. The system of claim 15, wherein the communication engine is configured to selectively communicate by communicating the reference upon a determination that the electronic file has a size that exceeds a threshold.

\* \* \* \* \*